United States Patent [19]

Higuchi et al.

[11] Patent Number: 4,983,505

[45] Date of Patent: Jan. 8, 1991

[54] OPTICAL RECORDING MEDIUM

[75] Inventors: Manabu Higuchi, Kanagawa; Masao Yabe, Shizuoka; Hideki Matsubara; Tetsuji Jitsumatsu, both of Aichi, all of Japan

[73] Assignee: Fuji Photo Film Co., Ltd., Ashigara, Japan

[21] Appl. No.: 381,424

[22] Filed: Jul. 18, 1989

[30] Foreign Application Priority Data

Jul. 19, 1988 [JP] Japan .................. 63-179761

[51] Int. Cl.$^5$ .................. G03C 1/00; G03C 1/492; B32B 15/08; C08F 2/46
[52] U.S. Cl. .................. 430/495; 430/270; 430/273; 430/945; 430/961; 522/96; 428/64; 428/425.8; 428/461
[58] Field of Search .......... 430/945, 273, 270, 533, 430/536, 961; 522/96; 428/425.8, 461

[56] References Cited

U.S. PATENT DOCUMENTS

| 4,508,916 | 4/1985 | Newell et al. | 556/420 |
| 4,590,493 | 5/1986 | Inoue et al. | 346/135.1 |
| 4,668,550 | 5/1987 | Tajima et al. | 428/65 |

*Primary Examiner*—Paul R. Michl
*Assistant Examiner*—Ashley Pezzner
*Attorney, Agent, or Firm*—Sixbey, Friedman, Leedom & Ferguson

[57] ABSTRACT

An optical recording medium comprising at least one recording layer on a substrate and a protective layer overlying the recording layer, the protective layer comprising a UV cured resin composition containing a urethane acrylate, N-vinylpyrolidone, a trifunctional or higher functional acrylate, and a photoinitiator.

6 Claims, 1 Drawing Sheet

OPTICAL RECORDING MEDIUM

FIELD OF THE INVENTION

The present invention relates to an improvement in optical recording media useful as high-speed data files or for recording video information. In particular, the present invention relates to an optical recording medium which has improved resistance to time-dependent deterioration in characteristics.

BACKGROUND OF THE INVENTION

Optical recording has many desirable features such as high density, large capacity and non-contact with the record/reproduce head. To take advantage of these features, active efforts are being made toward development and commercialization of this new technology. Two types of media, magneto-optical recording medium and phase-change recording medium, have been the subject of particular interest because of the facility they offer in performing erasure and subsequent recording.

A magnetic material is used in the recording layer of magneto-optical recording media and information is recorded as a change in magnetization while the recorded information is read as a change in the state of polarization of reproducing light. Amorphous rare earth/transition metal alloy systems based on alloys of rare earth metals such as Gb, Tb and Dy and transition metals such as Fe, Co and Ni (e.g., GdCo, GdFe, TbFe, DyFe, GdTbFe, GdFeCo, TbFeCo and TbFeNi) are commonly used as magnetic materials since they exhibit superior magneto-optical effects. Amorphous rare earth/transition metal alloy systems are formed into thin recording layers by sputtering or other thin-film processes and incorporated in magneto-optical recording media.

A problem with amorphous rare earth/transition metal alloy systems is that they are highly susceptible to oxidation and that their magnetic characteristics, such as coercive force, will decrease upon oxidation. This causes time-dependent deterioration in the characteristics of magneto-optical recording media, thus making it impossible to record and reproduce information in a consistent manner. Therefore, preventing oxidation of the recording layer made of amorphous rare earth/transition metal alloy systems has been one of the major requirements to be met in order to commercialize magneto-optical recording media by improving the long-term reliability of their performance.

The other type of optical recording media, i.e., phase-change recording medium, commonly relies upon the mechanism of a crystalline to amorphous phase change, in which information is recorded in a heating mode and reproduced on the basis of the change in reflectance that occurs in response to the phase change. The recording layer in a phase-change recording medium include Te based alloy or non-Te based alloy.

Phase-change recording media have also suffered from the problem that the recording layer is affected by aerial oxygen or moisture to become deteriorated in its characteristics although this problem is not as serious as in the case of magneto-optical recording media. A need has therefore existed for improving the resistance of the characteristics of phase-change recording media against time-dependent deterioration before they are commercialized.

Various methods have been proposed to prevent time-dependent deterioration of the recording layer in magneto-optical recording media. According to one proposal, metals such as Al, Ti, Cr and Pt are incorporated in the recording layer but it has been impossible to attain marked improvement in corrosion resistance and weathering properties.

It has also been proposed that protective layers be used to prevent time-dependent deterioration of the recording layer and this approach is roughly divided into two types, one employing protective layers made of inorganic materials, and the other using organic materials.

Known as inorganic protective layers are those which are formed of dielectrics such as oxides, nitrides and sulfides (e.g., $SiO_x$, $SiN_x$, $AlN_x$ and ZnS). Being an oxide, $SiO_x$ has had the potential to deteriorate, rather than improve, the magnetic characteristics of the recording layer even if a protective layer made of $SiO_x$ is used. $SiN_x$, $AlN_x$ and ZnS are non-oxides and hence provide a good barrier against air atmosphere. However, a long time has been necessary to form a layer thick enough to exhibit the desired effect. As a further problem, layers of increased thickness are prone to cracking due to internal stress and increased absorption of heat has led to a decrease in the sensitivity of magneto-optical recording media.

Known organic protective layer include those which are made of hot-melt resins, UV (ultraviolet ray) curable resins or EB (electron beam) curable resins. An example of the protective layers made of hot-melt resins is disclosed in JP-A-61-68750 (the term "JP-A" as used hereunder means an "unexamined published Japanese patent application"). These protective layers are formed on the recording layer by roll coating or some other suitable method. Although they have several advantages, such as comparatively high speed of film formation and ease of forming thick films, they have suffered from the problem that the recording layer is sometimes damaged by contact with metal rollers. UV curable resins also have several advantages that make them suitable for use in protective layers: lower initial investment is needed as compared with EB curable resins; thick films can be easily formed; the film has high heat and abrasion resistance; and pinholes are less likely to occur. Exemplary UV curable resins are disclosed in JP-A-60-117430, JP-A-61-133067, JP-A-61-144744, JP-A-62-189651, etc. Protective layers made of UV curable resins can be deposited in large thickness with comparative ease and exhibit high heat and abrasion resistance. However, protective layers made of UV curable resins have occasionally caused pinholes or corrosion in the recording layer on account of such factors as the presence of residual monomers, photoinitiators, catalysts, etc.

With a view to preventing time-dependent deterioration from occurring in phase-change recording media, protective layers have been provided by the same method as those employed with magneto-optical recording media but they have suffered from similar problems to those described above.

SUMMARY OF THE INVENTION

An object, therefore, of the present invention is to solve the aforementioned problems of the prior art and to provide an optical recording medium that is resistant to time-dependent deterioration in characteristics and that ensures improved long-term reliability in performance.

Other objects and effects of the present invention will be apparent from the following description.

The objects of the present invention can be attained by an optical recording medium comprising at least one recording layer on a substrate and a protective layer overlying the recording layer, the protective layer comprising a UV cured resin composition containing a urethane acrylate, N-vinylpyrrolidone, a trifunctional or higher functional acrylate (an acrylate having trifunctionality or higher functionality), and a photoinitiator.

DETAILED DESCRIPTION OF THE INVENTION

Figure 1:
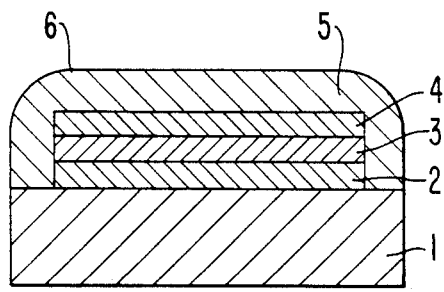
FIG. 1 is a diagram showing an illustrative magneto-optical recording medium having a protective layer formed of the UV curable resin composition of the present invention.

Among the components of the resin composition used in the present invention, N-vinylpyrrolidone and an acrylate of trifunctionality or higher functionality serve to accelerate the curing of the resin composition and reduce the residual monomers in the UV cured resin composition, thereby inhibiting the development of pinholes and corrosion that would otherwise occur in the recording layer. Urethane acrylate which is another component of the resin composition is so flexible that it will relax any strain that might develop on account of rapid changes in the environment of use, such as those in temperature, thus contributing to the making of a highly durable optical recording medium which withstands repeated use.

The urethane acrylate which is a component of the UV curable resin composition can be obtained by reacting a polyhydric alcohol, a polyisocyanate and a hydroxyl-containing acrylate in the usual manner, and one obtained by reacting a dihydric alcohol, a diisocyanate and a hydroxyl-containing acrylate may be used with particular preference. Urethane acrylates that will contribute increased strength and elongation to the cured product can be obtained if the polyhydric alcohol is selected from among polyester polyols such as those prepared by esterification reaction between organic polybasic acids (e.g., adipic acid, sebacic acid, maleic acid, isophthalic acid and terephthalic acid) and polyhydric alcohols (e.g., ethylene glycol, propylene glycol, diethylene glycol, 1,2-butylene glycol, 1,3-butylene glycol, 1,4-butylene glycol, 1,6-hexanediol, neopentyl glycol and trimethylolpropane), or those prepared by cyclic polymerization of ε-caprolactone. If polyether polyols such as polyethylene glycol, polypropylene glycol, polytetramethylene glycol and the ethylene oxide adduct of bisphenol A are used as polyhydric alcohols, urethane acrylates having low viscosity and which are highly resistant to hydrolysis can be obtained. Polyisocyanates that can be used include aromatic isocyanates such as tolylene diisocyanate, 4,4'-diphenylmethane diisocyante, 1,5-naphthylene diisocyanate, tolidine diisocyanate and xylylene diisocyanate, as well as alicyclic isocyanates such as 1,6-hexamethylene diisocyanate and isophorone diisocyanate. The urethane acrylate for use in the present invention preferably has an acryloyl equivalent (i.e., molecular weight per acryloyl group) of from 400 to 1,500. If the acryloyl equivalent of the urethane acrylate is less than 400, insufficient durability may sometimes occur. If the acryloyl equivalent is greater than 1,500, increased viscosity may sometimes cause problems such as reduction in handling property and curing rate. The resin composition for use in the present invention preferably contains from 35 to 70 wt %, more preferably from 35 to 55 wt%, of urethane acrylate If the content of urethane acrylate is less than 35 wt %, sufficient endurance is sometimes unattainable. If the urethane acrylate content is greater than 70 wt %, viscosity will increase, sometimes leading to reduction in handling property.

Examples of the urethane acrylates that are commercially available include Aronix M-1100, Aronix M-1200 and Aronix M-1310 (all being products of TOAGOSEI CHEMICAL INDUSTRY CO., LTD.), Viscoat 813 and Viscoat 823 (products of Osaka Organic Chemical Industry Co., Ltd.), and Ebecry 1210 and Ebecry 1270 (products of UCB Societe Anonyme).

Examples of the acrylates of trifunctionality or higher functionality that may be used in the present invention include: polyacrylates of polyhydric alcohols such as trimethylolpropane triacrylate, ditrimethylolpropane tetraacrylate, pentaerythritol triacrylate and dipentaerythritol hexacrylate; and other acrylates of trifunctionality or higher functionality including epoxy polyacrylates and polyester polyacrylates, such as Denacol DA-314 (product of NAGASE & CO., LTD.) and Aronix M-7100, Aronix M-8030 and Aronix M-8060 (all being products of TOAGOSEI CHEMICAL INDUSTRY CO., LTD.). In the present invention, these acrylates of trifunctionality or higher functionality are preferably contained in amounts of from 2 to 15 wt %, and more preferably from 8 to 15 wt %. If the content of these acrylates is less than 2 wt %, corrosion may sometimes develop in the recording layer. If the acrylate content is greater than 15 wt %, poor adhesion may sometimes occur between the protective layer and the recording layer.

Exemplary photoinitiators include; benzil, benzoin ethyl ether, benzoin isopropyl ether, benzophenone, 3,3'-dimethyl-4-methoxybenzophenone, 2,4-diethyl thioxanthone, 2,4-diisopropyl thioxanthone, 2-methyl-1-(4-(methylthio)phenyl)-2-morpholinopropanone, 2-hydroxy-2-methyl-1- phenylpropan-1-one, 1-(4-isopropylphenyl)-2-hydroxy-2-methylpropan-1-one, benzyl dimethyl ketal, methylbenzoyl formate, etc. Among these, 2-methyl-1-(4-(methylthio)phenyl)-2-morpholinopropane, 2-hydroxy-2-methyl-1-phenylpropan-1-one and 1-(4-isopropylphenyl)-2-hydroxy-2-methylpropane-1-one are preferred. These photoinitiators may be used either alone or as admixtures. Together with selected photoinitiators such as benzophenone, 3,3'-dimethyl-4-methoxybenzophenone, 2,4-diethylthioxanthone and 2,4-diisopropyl thioxanthone, photopolymerization accelerators such as ethyl p-dimethylaminobenzoate and isoamyl p-dimethylaminobenzoate may also be used. The amounts of photoinitiators and optionally used photopolymerization accelerators may be selected from among those which are commonly adopted for UV curable compositions that contain various kinds of acrylates as curable components. The preferred amount of the photoinitiator in the resin composition of the present invention is from 1 to 5 wt %.

The preferred amount of N-vinylpyrolidone in the UV curable resin composition is from 5 to 40 wt %, and more preferably from 10 to 30 wt %.

The UV curable resin composition of the present invention may incorporate other components such as monofunctional monomers, difunctional monomers, oligomers, antifoaming agents and leveling agents in amounts that will not impair the performance of said resin composition.

The protective layer in the optical recording medium of the present invention is composed of a cured product formed by exposing the composition described above to ultraviolet rays so that it will undergo curing reaction. The conditions of exposure to UV rays may conform to those which are commonly adopted to cure acrylic UV curable resin compositions.

The protective layer in the optical recording medium of the present invention which comprises a UV cured resin has a thickness which generally ranges from 2 to 30 μm, preferably from 5 to 10 μm. If the thickness of the protective layer is too small, it will not prove effective. If its thickness is too great, stress concentration will occur during curing on account of shrinkage, causing warpage in the optical recording medium.

If the optical recording medium of the present invention is to be used as a magneto-optical recording medium, the recording layer may be formed of thin films of various oxide-based or metallic magnetic materials. Exemplary thin films are those which are made of crystalline materials such as MnBi, MnAlGe and MnCuBi, single-crystal materials such as GdIG, BiSmErGaIG, and BiSmYbCoGeIG (wherein IG represents iron garnet), or amorphous materials such as GdCo, GdFe, TbFe, DyFe, GdFeBi, GdTbFe, GdTbCo, TbFeCo and TbFeNi. Among the recording layers formed of these material, those which are based on rare earth metals in combination with transition metals are particularly preferred from the viewpoints of such aspects as sensitivity and C/N (carrier/noise) ratio.

If the optical recording medium of the present invention is to be used as a phase-change recording medium, the recording layer is typically formed of Te based alloys or non-Te based alloys. Illustrative Te based alloys include TeSe, TeSb, TeAs, TeGe, TeIn, $TeO_x$ and TeSn alloys. To these alloys, other elements such as Sb-As, Ge, In, S, Sn and O may sometimes be added. Particularly preferred Te based alloys are $TeGeSnO_x$, TeSb and TeGeSb. Illustrative non-Te based alloys include SeSb, SeGa, SeIn, InSb, SeS, SbGa, InBi and SeGeSb alloys. To these alloys, other elements such as Se, Sb, As, Ge and In may sometimes be added. Particularly preferred non-Te based alloys are SeIn, InSb, InSbSe and InSeTl. The alloys listed above are deposited as thin films to form phase-change recording layers.

Also included within the scope of the present invention is an embodiment in which the protective layer formed of the cured product of the UV curable resin composition described above is combined with an inorganic protective layer. More specifically, two inorganic protective layers may be provided on the both sides of the recording layer in contact therewith and is overlaid with the protective layer formed of the cured product described above. This arrangement is effective in completely preventing time-dependent deterioration of the magneto-optical recording medium. If the inorganic protective layer is made of a dielectric such as $SiN_x$, the magneto-optical effect of the recording layer is enhanced to achieve further improvement in the characteristics of the magneto-optical recording medium.

Preferred examples of the materials that may be used to make the inorganic protective layer are dielectrics including oxides, nitrides and sulfides such as $SiO_x$, $SiN_x$, $AlN_x$ and ZnS.

The protective layer which, according to the present invention, is formed of the cured product of the UV curable resin composition described above covers at least the top surface of the recording layer and preferably covers not only the top surface of the recording layer or other layers, such as the inorganic protective layer that are provided in contact with the recording layer, but also the lateral surfaces of these layers.

The substrate of the optical recording medium of the present invention is typically made of such materials as polycarbonates, polymethyl methacrylate, epoxies, and glass.

The optical recording medium according to the present invention is also applicable to a so-called both-sides-recording medium in which two single-sided optical recording media are united by adhering the protective layers through an adhesive layer in such a manner that the sides of the substrates on which the recording layers are not provided face the outside.

The following examples are provided for the purpose of further illustrating the present invention but are in no way to be taken as limiting.

EXAMPLE 1

As shown in FIG. 1, a disk of polycarbonate substrate 1 having a diameter of 130 mm and a thickness of 1.2 mm was successively coated with the following layers by a magnetron sputtering process: an SiNx layer 2 in a thickness of 1,000 Å, a recording layer 3 in a thickness of 1,000 Å which was made of an amorphous rare earth/transition metal alloy system having the composition Tb22Fe66Co12, and a protective $SiN_x$ layer 4 in a thickness of 1,000 Å. A UV curable resin composition (for its composition, see below) was spin-coated to form a protective layer 5 (10 μm thick) both on top of the protective $SiN_x$ layer 4 and on lateral sides of the superposed layers as shown in FIG. 1. Thereafter, the assembly was exposed to ultraviolet rays at an energy of approximately 50 $mW/cm^2$ for 2 min to cure the UV curable resin composition, thereby producing a magneto-optical recording medium 6.

| | |
|---|---|
| Urethane acrylate A (see below) (aromatic isocyanate/polyester polyol) | 60 parts by weight |
| Polyester polyacrylate of trifunctionality or higher functionality (Aronix M-8060 of TOAGOSEI CHEMICAL INDUSTRY CO., LTD.) | 10 parts by weight |
| N-Vinylpyrrolidone | 20 parts by weight |
| 2-Hydroxyphenyl-3-phenoxypropyl acrylate (Aronix M-5700 of TOAGOSEI CHEMICAL INDUSTRY CO., LTD.) | 10 parts by weight |
| 2-Hydroxy-2-methyl-1-phenylpropan-1-one (Darocur 1173 of Merck Japan Co., Ltd.) | 5 parts by weight |

COMPARATIVE EXAMPLE 1

The procedures of Example 1 were repeated under the same conditions as those employed in Example 1 except that a UV curable resin composition having the composition shown below was substituted.

| | |
|---|---|
| Urethane acrylate A (see below) (aromatic isocyanate/polyester polyol) | 60 parts by weight |
| N-Vinylpyrrolidone | 30 parts by weight |
| 2-Hydroxyphenyl-3-phenoxypropyl acrylate (Aronix M-5700 of TOA-GOSEI CHEMICAL INDUSTRY CO., LTD.) | 10 parts by weight |
| 2-Hydroxy-2-methyl-1-phenylpropan-1-one (Darocur 1173 of Merck Japan Co., Ltd.) | 5 parts by weight |

COMPARATIVE EXAMPLE 2

The procedures of Example 1 were repeated under the same conditions as those employed in Example 1 except that a UV curable resin composition having the composition shown below was substituted.

| | |
|---|---|
| Urethane acrylate B (see below) (aromatic isocyanate/polyester polyol) | 60 parts by weight |
| Polyester polyacrylate of tri-functionality or higher functionality (Aronix M-8060 of TOAGOSEI CHEMICAL INDUSTRY CO., LTD.) | 10 parts by weight |
| Ethyl carbitol acrylate (Biscote 190 of Osaka Organic Chemical Industry Co., Ltd.) | 30 parts by weight |
| 2-Hydroxy-2-methyl-1-phenylpropan-1-one (Darocur 1173 of Merck Japan Co., Ltd.) | 5 parts by weight |

COMPARATIVE EXAMPLE 3

The procedures of Example 1 were repeated under the same conditions as those employed in Example 1 except that a UV curable resin composition having the recipe shown below was substituted.

| | |
|---|---|
| Bisphenol A/diglycidyl ether diacrylate | 70 parts by weight |
| Ethyl carbitol acrylate (Biscote 190 of Osaka Organic Chemical Industry Co., Ltd.) | 30 parts by weight |
| 2-Hydroxy-2-methyl-1-phenylpropan-1-one (Decocure 1173 of Merck Japan Co., Ltd.) | 5 parts by weight |

Urethane acrylate A and urethane acrylate B identified above were synthesized under the following conditions.

Urethane acrylate A

Adipic acid (4 mol) and neopentyl glycol (5 mol) were charged into a reaction vessel and heated at 150° to 200° C. with nitrogen gas being blown at a rate of 0.05 L/min so as to perform dehydrative esterification reaction until a polyester polyol having an average degree of condensation of 4 was formed. Subsequently, tolylene diisocyanate was added to the polyester polyol and the mixture was heated at 85° C. Following addition of 2-hydroxyethyl acrylate, the mixture was heated at 85° C. with air being blown at a rate of 0.05 L/min, so as to obtain urethane acrylate A having an acryloyl equivalent of ca. 550.

Urethane acrylate B

Adipic acid (6 mol), ethylene glycol (7.3 mol) and 1,2-propylene glycol (3.6 mol) were charged into a reaction vessel and heated at 150° to 200° C. with nitrogen gas being blown at a rate of 0.05 L/min so as to perform dehydrative esterification reaction. Thereafter, the mixture was heated at 150° to 200° C. at a reduced pressure of 5 mmHg to perform condensation reaction for obtaining a polyester polyol having a number average molecular weight of ca. 3800. Subsequently, as in the case of synthesis of urethane acrylate A, this polyester polyol was reacted with tolylene diisocyanate and 2-hydroxyethyl acrylate to obtain urethane acrylate B having an acryloyl equivalent of ca. 2200.

In order to cause accelerated aging, the samples of magneto-optical recording medium fabricated in Example 1 as well as in Comparative Examples 1, 2 and 3 were left to stand for 200 hours in a thermo-hygrostat set at 80° C. and at 85% RH. Thereafter, the appearance of the samples was observed and measurements of C/N (carrier/noise) ratio and BER (bit error rate) were conducted under the following conditions to obtain data that could be compared with the initial data to permit evaluation of the effects of aging on the test samples.

Observation of appearance

The morphology of the recording region on the recording layer was observed visually under transmitted light to check for the occurrence of any surface defect. In Table 1, the term "pinhole" refers to a defective area not exceeding several tens of micrometers in size, whereas the term "corrosion" refers to defective area of a size of at least 100 μm.

C/N ratio

Each sample of magneto-optical recording medium was rotated at 1,800 rpm and irradiated with repetitive pulses of laser light at a single carrier frequency of 3.7 MHz for evaluation of C/N ratio.

BER

Defined as the number of erroneous reproduced bits divided by the number of recorded bits.

The results of observation and measurements are shown in Table 1, in which C/N(o) and BER(o) refer to the initial values of respective parameters that were obtained before the samples were left to stand in the thermohygrostat, whereas C/N(t) and BER(t) refer to the values obtained after 200-hours standing in the thermohygrostat.

TABLE 1

| | Appearance | C/N(t)/C/N(o) | BER(t)/BER(o) |
|---|---|---|---|
| Example 1 | no change | 0.99 | 1.01 |
| Comparative Example 1 | corrosion developed | 0.98 | 5.2 |
| Comparative Example 2 | pinholes developed | 0.98 | 3.8 |
| Comparative Example 3 | pinholes developed | 1.01 | 2.3 |

The results in Table 1 show that the magneto-optical recording medium prepared in Example 1 that was coated with a protective layer composed of the UV cured resin composition according to the present invention experienced little changes in characteristics even when it was left to stand in a hot and humid atmosphere for a prolonged period. In contrast, the samples prepared in Comparative Examples 1, 2 and 3 suffered the problem that corrosion or pinholes developed in the recording layer after they were left to stand in a thermo-hygrostat for 200 hours at 80° C. and at 85% RH. Because of these defects, the comparative samples produced burst errors which led to severse deterioration in BER.

EXAMPLE 2

Figure 2:
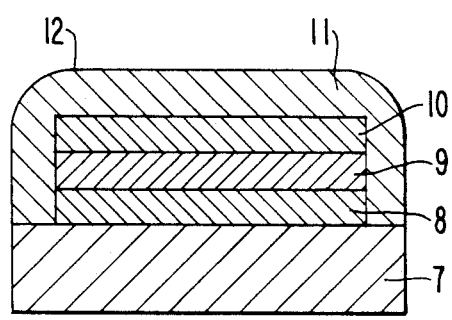
FIG. 2 is a diagram showing an illustrative phase-change recording medium having a protective layer formed of the UV curable resin composition of the present invention.

As shown in FIG. 2, a disk of polycarbonate substrate 7 having a diameter of 130 mm and a thickness of 1.2 mm was successively coated with the following layers by a magnetron sputtering process; an $SiO_2$ layer 8 in a thickness of 1,000 Å, a phase-change recording layer 9 in a thickness of 1,000 Å which had one of the compositions shown in Table 2, and an overlying protective $SiO_2$ layer 10 in a thickness of 1,000 Å. A UV curable resin composition of the same composition as that employed in Example 1 was spin-coated to form a protective layer 11 (10 μm thick) both on top of the protective $SiO_2$ layer and on lateral sides of the superposed layers as shown in FIG. 2. Thereafter, the assembly was exposed to ultraviolet rays at an energy of approximately 50 mW/cm² for 2 min to cure the UV curable resin composition, thereby producing phase-change recording medium 12.

TABLE 2

| Phase-change optical recording layer | Te | Sb | | |
|---|---|---|---|---|
| | Te | Ge | Sb | |
| | Te | Ge | Sn | O |
| | In | Sb | | |
| | In | Sb | Se | |
| | In | Se | Tl | |

COMPARATIVE EXAMPLE 4

The procedures of Example 2 were repeated under the same conditions as those employed in Example 2 except that a UV curable resin composition having the same composition as that used in Comparative Example 1 was substituted.

COMPARATIVE EXAMPLE 5

The procedures of Example 2 were repeated under the same conditions as those employed in Example 2 except that a UV curable resin composition having the same composition as that used in Comparative Example 2 was substituted.

COMPARATIVE EXAMPLE 6

The procedures of Example 2 were repeated under the same conditions as those employed in Example 2 except that a UV curable resin composition having the same composition as that used in Comparative Example 3 was substituted.

The samples of phase-change recording medium fabricated in Example 2 as well as in Comparative Examples 4, 5 and 6 were left to stand for 30 days in a thermohygrostat set at 60° C. and at 90% RH. Thereafter, the appearance of the samples was observed and measurements of C/N ratio and BER (bit error rate) were conducted under the same conditions as in Example 1 to obtain data that could be compared with the initial data to permit evaluation of the effects of aging on the test samples.

The results of observation and measurements are shown in Table 3, in which C/N(o) and BER(o) refer to the initial values of respective parameters that were obtained before the samples were left to stand in the thermo-hygrostat, whereas C/N(t) and BER(t) refer to the values obtained after 200-hours standing in the thermo-hygrostat.

TABLE 3

| Phase-change optical recording layer | Appearance | | | | C/N(t)/C/N(o) | | | | BER(t)/BER(o) | | | |
|---|---|---|---|---|---|---|---|---|---|---|---|---|
| | Example | Comparative Example | | | Example | Comparative Example | | | Example | Comparative Example | | |
| | 2 | 4 | 5 | 6 | 2 | 4 | 5 | 6 | 2 | 4 | 5 | 6 |
| TeSb | no change | corrosion developed | pinhole developed | pinhole developed | 0.9 | 1.0 | 0.9 | 0.8 | 1.0 | 2.5 | 1.7 | 2.8 |
| TeGeSb | no change | corrosion developed | pinhole developed | pinhole developed | 0.9 | 0.8 | 0.8 | 0.9 | 1.3 | 3.4 | 2.3 | 1.7 |
| TeGeSnO | no change | corrosion developed | pinhole developed | pinhole developed | 1.0 | 0.7 | 0.7 | 0.8 | 1.1 | 18.7 | 4.1 | 3.3 |
| InSb | no change | corrosion developed | pinhole developed | pinhole developed | 0.9 | 0.8 | 0.9 | 1.0 | 1.4 | 7.6 | 1.9 | 1.5 |
| InSbSe | no change | corrosion developed | pinhole developed | pinhole developed | 1.1 | 0.9 | 1.0 | 0.9 | 1.2 | 6.3 | 2.0 | 2.3 |
| InSeTl | no change | corrosion developed | pinhole developed | pinhole developed | 0.9 | 0.6 | 0.9 | 0.9 | 1.6 | 30.4 | 3.9 | 1.9 |

The data in Table 3 shows that the phase-change recording medium prepared in Example 2 that was coated with a protective layer composed of the UV cured resin composition according to the present invention experienced little changes in characteristics even when it was left to stand in a hot and humid atmosphere for a prolonged period. In contrast, the samples prepared in Comparative Examples 4, 5 and 6 experienced considerable changes in the surface state of the recording layers when they were left to stand in a thermohygrostat for 30 days at 60° C. and at 90% RH and this led to increased BERs. The deterioration in the surface state of the recording layers was particularly great in the sample of Comparative Example 4, causing substantial increase in BER. In addition, the recording layers made of TeGeSnO and InSeTl suffered increased deterioration in C/N upon aging.

While the invention has been described in detail and with reference to specific embodiments thereof, it will be apparent to one skilled in the art that various changes and modifications can be made therein without departing from the spirit and scope thereof.

We claim:

1. An optical recording medium comprising at least one recording layer on a substrate, further comprising a protective layer comprising a UV cured resin of a composition containing a urethane acrylate, N-vinyl-pyrrolidone, a trifunctional or greater functional acrylate, and a photoinitiator, wherein the urethane acrylate has at least two acryloyl groups in the molecule and a molecular weight of 400 to 1,500 per acryloyl group.

2. An optical recording medium as claimed in claim 1, wherein the urethane acrylate content of said UV cured resin composition is from 35 to 70 wt %.

3. An optical recording medium as claimed in claim 1, wherein the content of acrylate having trifunctionality or higher functionality in said UV cured resin composition is from 2 to 15 wt %.

4. An optical recording medium as claimed in claim 1, wherein the content of N-vinylpyrolidone in said UV cured resin composition is from 5 to 40 wt %.

5. An optical recording medium as claimed in claim 1, wherein the thickness of said protective layer is from 2 to 30 $\mu m$.

6. An optical recording medium as claimed in claim 1 further comprising two inorganic protective layers provided on the both sides of said recording layer in contact therewith.

* * * * *